No. 694,782. Patented Mar. 4, 1902.
W. H. PRINZ.
METHOD OF TESTING BARLEY AND MALT.
(Application filed July 12, 1901.)
(No Model.) 2 Sheets—Sheet I.
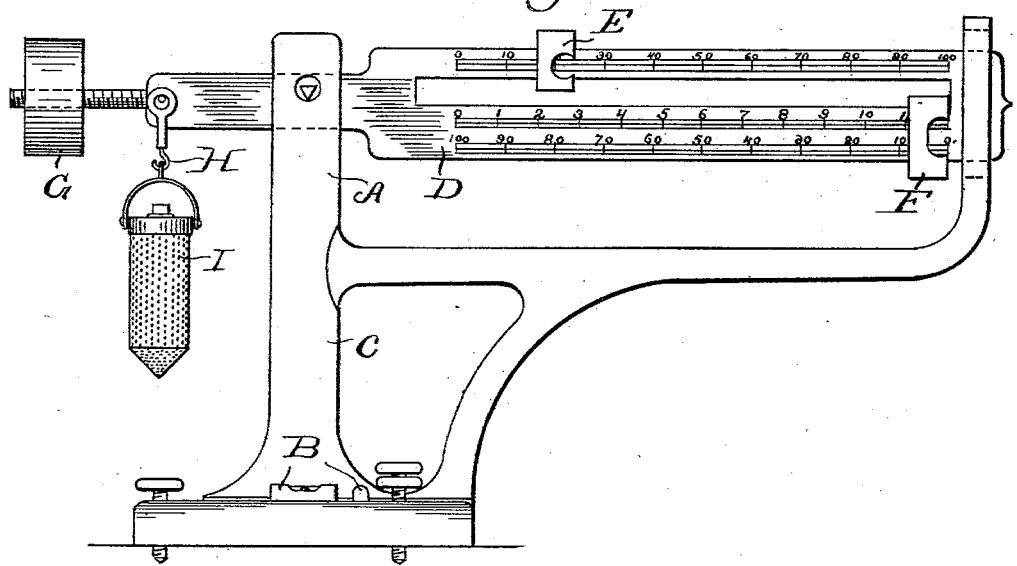
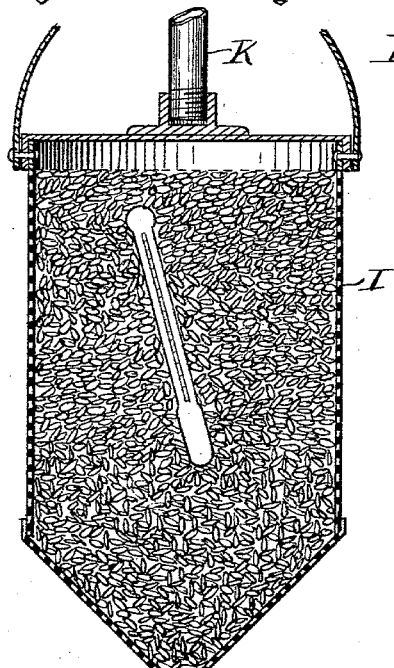
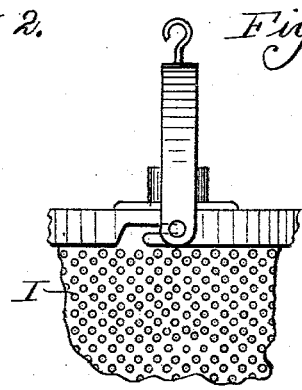
Witnesses:
E. F. Wilson
John Snawhook
Inventor:
William H. Prinz
By Rudolph Wm. Lotz
Attorney No. 694,782. Patented Mar. 4, 1902.
W. H. PRINZ.
METHOD OF TESTING BARLEY AND MALT.
(Application filed July 12, 1901.)
(No Model.) 2 Sheets—Sheet 2.
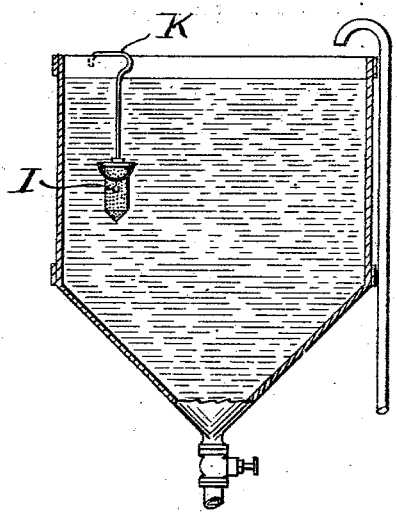
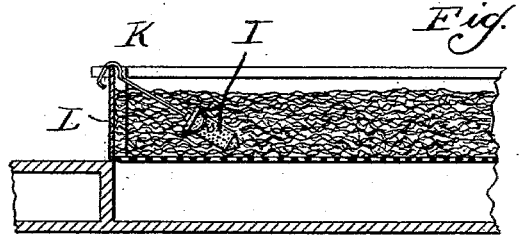
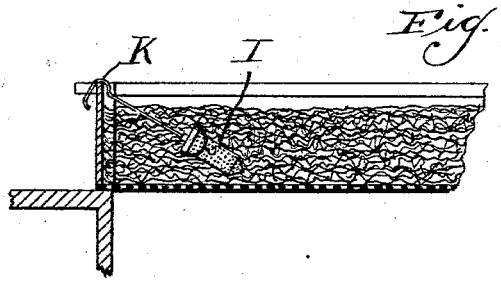
Witnesses:
E. F. Wilson
John Snowhook
Inventor:
William H. Prinz
By Rudolph Wm. Lotz
Attorney

UNITED STATES PATENT OFFICE.

WILLIAM H. PRINZ, OF CHICAGO, ILLINOIS.

METHOD OF TESTING BARLEY AND MALT.

SPECIFICATION forming part of Letters Patent No. 694,782, dated March 4, 1902.

Application filed July 12, 1901. Serial No. 68,023. (No specimens.)

*To all whom it may concern:*

Be it known that I, WILLIAM H. PRINZ, a citizen of the United States, residing at Chicago, in the county of Cook and State of Illinois, have invented certain new and useful Improvements in Methods of Testing Barley or other Grain and Malt; and I do hereby declare the following to be a full, clear, and exact description of the invention, such as will enable others skilled in the art to which it appertains to make and use the same.

My invention relates to a novel method for determining the proper duration of each step in the process of malting grain and the points where loss occurs and also to determine the exact per cent. of shrinkage in weight of the grain after the malting process is completed.

The object of my invention is to provide a very simple method for accomplishing the above-described purposes; and it consists in the various steps hereinafter fully described and claimed.

In the accompanying drawings, illustrating apparatus for carrying out my method, Figure 1 is a side elevation of a scale employed. Fig. 2 is a central longitudinal section of a small perforated grain-receptacle employed. Fig. 3 is a fragmentary detail side elevation of said receptacle, showing the manner of securing the cover thereon. Fig. 4 is a central vertical section of a steep-tank, showing the receptacle therein. Fig. 5 is a fragmentary section of a malting-compartment, showing the receptacle inserted with the grain to subject its contents to the malting process. Fig. 6 is a fragmentary section of a malt-kiln compartment, showing said receptacle inserted in the malt to be dried, so that its contents may also be dried.

According to the Winchester system standard barley weighs forty-eight pounds per bushel or twelve ounces per pint. Hence for convenience a pint of barley may be taken as a test measure.

Barley usually contains from ten to twelve per cent. moisture, which is allowed by all inspection offices. To weigh such barley, I provide a scale A, comprising a base provided with spirit-levels B to level it and having a standard C, on which the scale-beam D is pivotally mounted on knife-edge pivots. Said scale-beam D is provided with three graduated scales, the uppermost of which reads from left to right and is marked from "0" to "100" to represent percentage, and moving over said scale is a movable weight E. The next lower graduated scale represents ounces and reads from left to right from "0" to "12." The lowermost scale reads from right to left and is marked from "0" to "100" to represent percentage. A weight F is movable over both the lowermost graduated scales. At the other end of said scale-beam is an adjustable counterweight G and a hook H, upon which the perforated malt-receptacle I is adapted to be hung. Before introducing grain into said receptacle I the latter, after inserting a thermometer J, is hung on said hook H, the weights E and F are moved to the left-hand ends of the graduated scales, and said counterweight G is then moved until the scale-beam balances exactly. Grain is then introduced into said receptacle I to the weight of twelve ounces, which is determined by moving the weight F to the position shown in Fig. 1 and then introducing such grain until the scale-beam balances. Said receptacle is then removed, a handle K mounted thereon, and it is then hung in a steep-tank, as shown in Fig. 4.

In the process of malting it is necessary that the grain should absorb from thirty-five to sixty per cent. of moisture, (by weight,) the amount depending largely upon the condition of the grain and desired character of the malt. In order to determine when the grain has absorbed sufficient moisture and the steeping process is completed, the said receptacle is removed at intervals, the handle detached, and it is again hung on the hook H. By then moving the weight E toward the right until the beam balances (the weight F remaining in the position shown in Fig. 1) the percentage of moisture contained will be indicated. This operation is repeated until the desired percentage of moisture is indicated on the scale. The grain is then removed from the steep-tank to the malting-compartment L, where it is germinated, the receptacle I being inserted in the body of the grain, so as to germinate simultaneously with the balance of the grain. Said receptacle is removed at frequent intervals during the germinating process and weighed, and as during this process the grain loses moisture and gases such frequent weighing will determine the point at which the greatest loss occurs and will indicate any irregularity in the process. In weighing during germination the weight E is moved gradually toward the pivot of the scale-beam, thus showing the gradual loss in weight by ounces and percentage. After completing the germinating process the green malt is transported to the kiln and dried by passing hot air through the mass. During the drying process the receptacle I is again weighed at frequent intervals to determine the rapidity and amount of evaporation in a given time and will readily indicate at any stage of the process whether evaporation proceeds or not. As said malt is drying the weight E will be gradually moved toward the pivot of the scale until it stands at "0" on the graduated scale, and the weight F will then gradually be moved in the same direction, so that when the drying process has been completed the lowermost graduated scale will indicate the total loss in weight, by ounces and percentage, by malting. In this manner I am enabled to definitely establish the proper duration of each step in the malting process and the exact point in each step at which progress stops or recedes and to make such corrections as may be necessary to overcome any difficulty experienced.

It is obvious that by obviating unnecessary loss of weight in any step in the malting process the capacity and consequent profit derived from a malt-house may be greatly increased and at the same time a better grade of malt produced.

I claim as my invention—

The method of testing barley and malt which consists in placing a given quantity of barley in a perforated receptacle, weighing the same and then subjecting such barley to any one or all steps in the malting process by inserting said receptacle in the body of barley during such process or any step thereof, and weighing said barley contained in said receptacle at frequent intervals during each step of the process to determine the percentage of gain or loss in weight thereof, whereby any fault in any step of the malting process may be determined.

In testimony whereof I affix my signature in presence of two witnesses.

WILLIAM H. PRINZ.

Witnesses:
 RUDOLPH WM. LOTZ,
 JOHN SNOWHOOK.